W. H. WILEMAN.
ATTACHMENT FOR HYDRANTS.
APPLICATION FILED OCT. 13, 1908.
959,092.
Patented May 24, 1910.
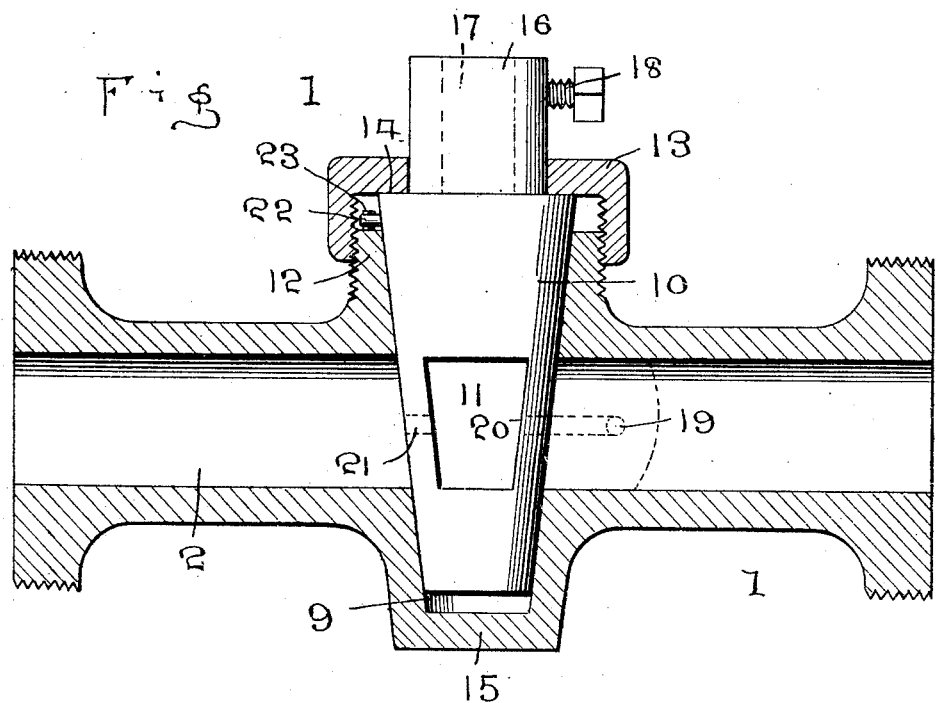
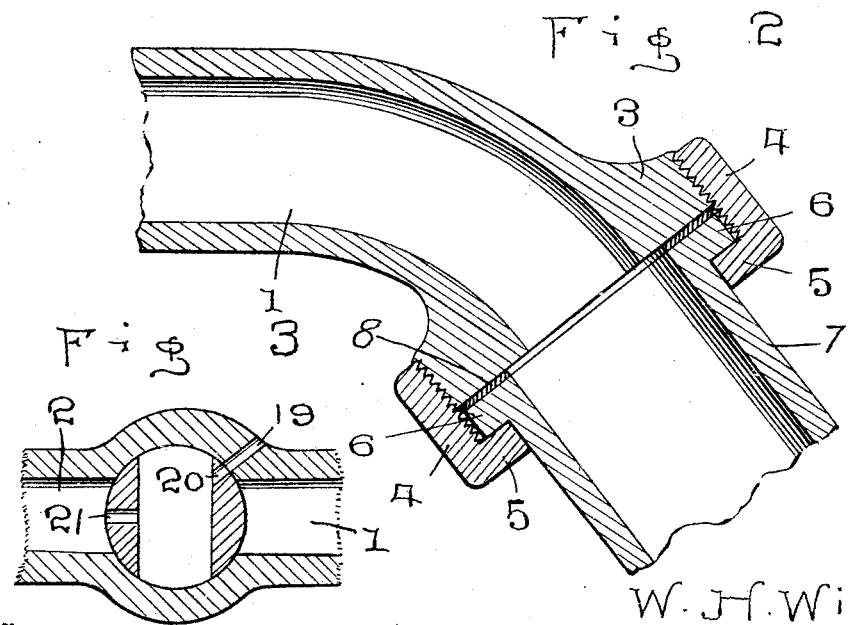
Witnesses
Thos. W. Riley
M. A. Newcomb
Inventor
W. H. Wileman
By W. J. Fitzgerald & Co.
Attorneys

UNITED STATES PATENT OFFICE.

WINFRED HUGH WILEMAN, OF WOODRUFF, KANSAS.

ATTACHMENT FOR HYDRANTS.

959,092.  Specification of Letters Patent.  Patented May 24, 1910.

Application filed October 13, 1908. Serial No. 457,496.

*To all whom it may concern:*

Be it known that I, WINFRED HUGH WILEMAN, a citizen of the United States, residing at Woodruff, in the county of Phillips and State of Kansas, have invented certain new and useful Improvements in Attachments for Hydrants; and I do hereby declare the following to be a full, clear, and exact description of the invention, such as will enable others skilled in the art to which it appertains to make and use the same.

My invention relates to new and useful improvements in attachments for hydrants, etc., and my object is to provide a suitable cut off or stop cock for the hydrant.

A further object is to provide suitable means for compensating for the wear of the stem of the stop cock.

A further object is to provide a device of this class which may be connected directly to the water main and a still further object is to provide a suitable waste vent for the cut off.

Other objects and advantages will be hereinafter referred to and more particularly pointed out in the claim.

In the accompanying drawings which are made a part of this application, Figure 1 is a sectional view through the stop-cock showing my improved waste vent, and, Fig. 2 is a detail sectional view showing the manner of attaching the stop cock to a water main having a curve therein. Fig. 3 is a fragmentary sectional view disclosing more fully the venting port and registering port of the valve-stem.

Referring to the drawings in which similar reference numerals designate corresponding parts throughout the several views, 1 indicates the body of my improved stop cock, which is preferably oblong and provided with an opening 2, the ends of the body terminating in flanges 3, the peripheral surfaces of which are threaded to receive an interiorly threaded collar 4, said collar having an inwardly extending rib 5 adapted to engage a flange 6 (on the main pipe line 7 and by which means the body portion is secured to the main line, leakage between the ends of the pipe line and the body,) being prevented by introducing suitable packing 8 between the abutting ends of the pipe line and the body.

In the length of the body 1 is provided a socket 9, which is preferably inwardly tapered from its upper to its lower end and is adapted to receive a stem 10, which is likewise tapered to fit the tapered socket 9. The stem 10 is disposed at right angles to the trend of the opening 2 and intersects the same, whereby the passage of the contents of the pipe line may be regulated and in order to allow the contents of the pipe line to flow uninterruptedly, the stem 10 has extending therethrough a way 11, whereby when the stem is turned until the way registers with the opening 2, the contents of the pipe line may readily flow through the stop cock, but when the stem is turned to dispose the way 11 across the trend of the opening 2, the flow of the contents of the pipe line will be stopped.

The upper end 12 of the socket wall is exteriorly threaded and is adapted to be engaged by an interiorly threaded cap 13, the closed end of the cap engaging a shoulder 14 on the stem 10 to move the stem downwardly and hold the same firmly seated against the tapered face of the socket 9. This manner of adjustably holding the stem within the socket enables me to dispense with the usual form of bolt and nut at the lower end of the stem and enables me to form the lower end 15 of the socket wall, solid, thereby preventing any leakage at this point and at the same time dispensing with the undesirable features encountered in the old form of bolt in having the nut come loose from the bolt and permitting the stem to play in its socket thus resulting in leakage around the stem. The taper of the stem 10 is such that the upper end thereof will project above the end of the wall of the socket 9, while the lower end of the stem will be positioned a distance from the lower end 15 of the socket, thereby permitting longitudinal downward movement of the stem to compensate for any wear between the stem and wall of the socket. The stem 10 is provided with a projection 16, in which is formed a recess 17, in which is to be entered any suitable form of wrench to rotate the stem and if desired, the wrench may be fixed in the recess by means of a set screw or the like 18.

To prevent water from remaining in the hydrant after the pressure has been turned off, a waste vent 19 is provided in the wall of the body 1 opening therethrough to the outside, the inner end of which is adapted to communicate with a port 20 in the wall of the stem 10, while that portion of the stem opposite the port 20 is also provided with a port 21, the inner ends of the ports 20 and 21 communicating with the way 11 and when the stem 10 is turned to cut off the flow of water to the hydrant, the port 20 will be in communication with the vent 19, while the port 21 will be in communication with that portion of the opening 2 toward the hydrant, thereby permitting the water remaining between the hydrant and stem to escape through the port 21 into the way 11 and thence through the port 20 into the vent 19 to the outside and as the vent 19 communicates with the exterior of the body, the water thus entering the vent will be carried to the outside of the stop cock. By thus removing the water from the hydrant, the freezing of the water in the hydrant is obviated, as it will be clearly understood that the stop cock is positioned a sufficient distance below the surface of the ground as to be below the freezing line.

The stem is provided with a suitable stop 22, which is adapted to engage a similar stop 23 on the upper end of the socket, so that the port 20 will always come in registration with the vent when the stop cock is closed.

As shown in Fig. 2, the body 1 may be curved to compensate for the change of the trend of the pipe line and while I have shown and described my improved attachment as connected to water mains and hydrants, it will be fully understood that the same may be used in connection with various lines through which fluid is conveyed. It will further be seen that my improved stop cock can be readily and quickly applied at any point along the pipe line and at a minimum cost, as the usual procedure of tapping, etc., required in the old form of stop cock is obviated.

What I claim is:

A device of the character described, comprising a tubular body having a transverse socket extending to a point below its bore and above said bore, a tapered plug received by said socket, means for the retention of said plug in operative position in said socket, said body having a venting port extending horizontally through one side thereof and at an acute angle to the axis of said body, said port having its outer end delivering in a direction about parallel with the length of said body, and said plug having a way through it of substantially the same cross sectional area as the bore of said body, said plug also having ports, one opening laterally therethrough and communicating with said bore and said way, and the other port also being adapted to communicate with said bore and to register with said venting port as said plug is turned to cut off communication between its way and the bore of the body.

In testimony whereof I have signed my name to this specification in the presence of two subscribing witnesses.

WINFRED HUGH WILEMAN.

Witnesses:
G. O. HARBAUGH,
A. R. WILLIAMS.